United States Patent [19]

Dobedoe et al.

[11] 3,748,639

[45] July 24, 1973

[54] SAFETY BELT ALARM SYSTEM

[76] Inventors: Thomas J. L. Dobedoe, 10 Red House Gardens, Wateringbury; Ronald F. Robins, 19 Elm Grove, Thorpe Bay; Frederick J. Brookes, Arley House, Bulphan, Upminster, all of England

[22] Filed: Nov. 26, 1971

[21] Appl. No.: 202,464

[52] U.S. Cl. ............ 340/52 E, 340/278, 307/10 SB
[51] Int. Cl. ............................................. B60r 21/00
[58] Field of Search ................ 340/52 D, 52 E, 278, 340/279; 307/10 SB

[56] References Cited
UNITED STATES PATENTS 3,588,811   6/1971   Prickett............................. 340/52 E
3,340,523   9/1967   Whitman........................ 340/52 E X

*Primary Examiner*—Alvin H. Waring
*Attorney*—Keith L. Zerschling and Robert W. Brown

[57] ABSTRACT

A motor vehicle seat belt alarm system includes a body structure and a seat belt assembly. Transmitter and receiver devices are attached to the body structure and to a portion of the seat belt assembly to determine if the latter passes in front of a passenger in the vehicle. Electrical circuitry energizes an alarm when the seat belt assembly is not fastened or properly positioned. The transmitter device may produce an ultrasonic signal.

9 Claims, 2 Drawing Figures

SAFETY BELT ALARM SYSTEM

This invention relates to motor vehicles which have safety belts. Although safety belts are very effective when work for protecting vehicle passengers from serious injury in the event of an accident, very few people wear them. There have been proposals for alternative passenger restraint systems which function without passenger action. The air bag is the best known of these so-called passive restraint systems. Unfortunately, these passive restraint systems are much more expensive and less effective than seat belts.

The present invention seeks to prevent or discourage the practice of driving around without having the seat belts properly fastened.

According to the invention, a motor vehicle has the following features:

a. a forward facing passenger seat mounted within a body structure;
b. a seat belt assembly for a passenger in the seat is connected to the body structure;
c. a transmitter and a receiver are arranged in the vehicle such that the receiver responds to signals transmitted by the transmitter if the belt passes in front of a passenger but not if the belt passes behind the passenger; and
d. an alarm circuit is arranged to energize an alarm if the receiver does not respond to the signals produced by the transmitter.

Figure 1:
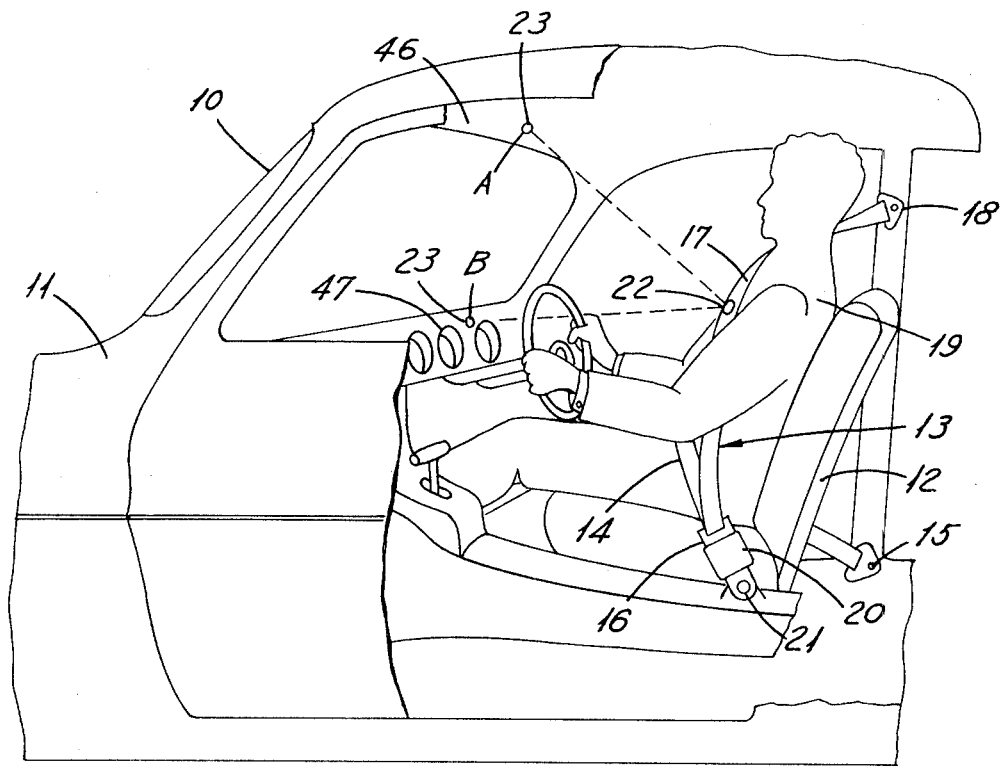
Figure 2:
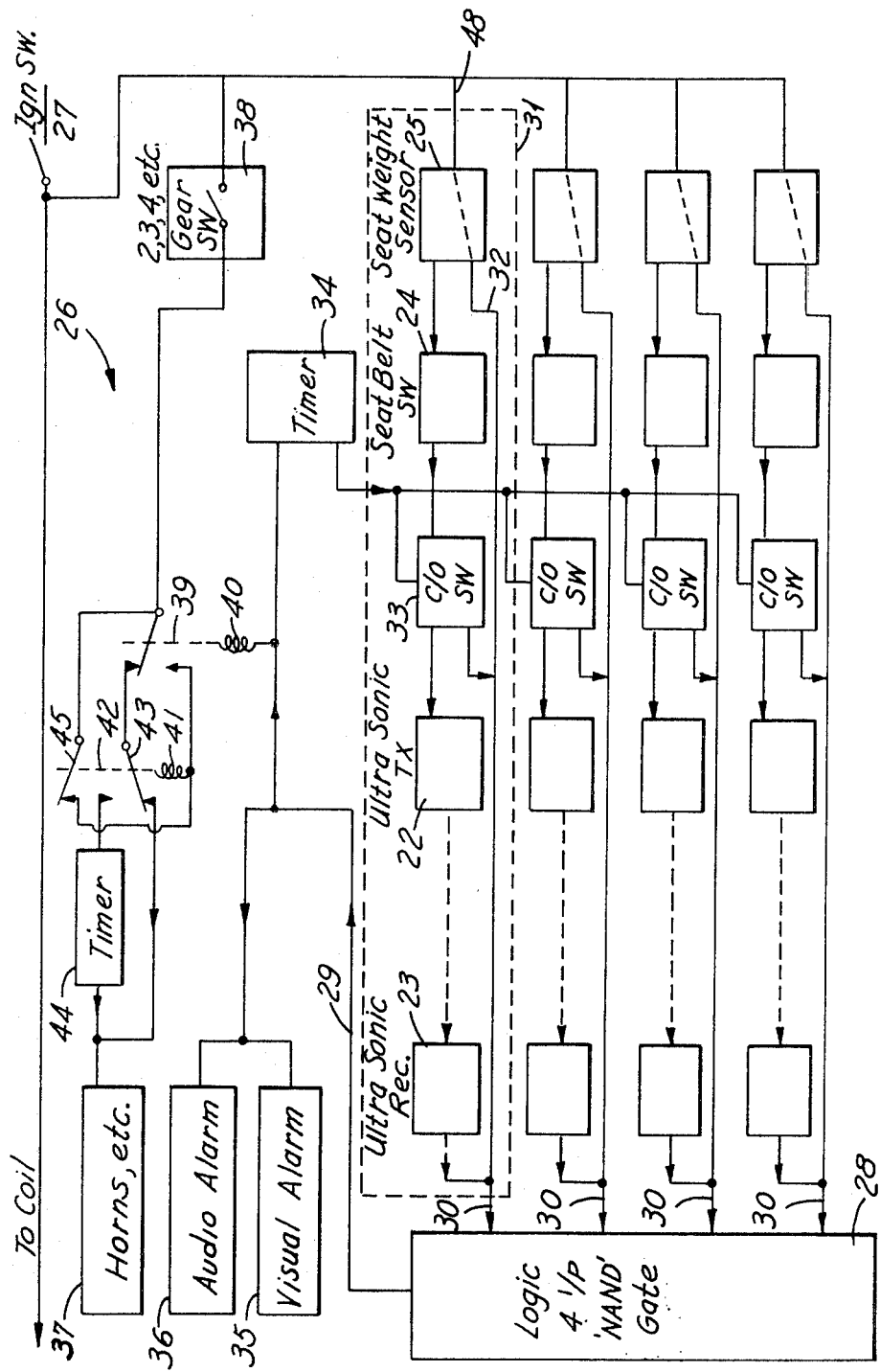

The invention will now be described with reference to and as shown in the accompanying drawings, in which:

FIG. 1 is a cut-away perspective view of a motor vehicle embodying the invention; and FIG. 2 is a circuit diagram for the embodiment of FIG. 1.

A motor vehicle 10 includes a body structure 11 to which are fixed a number of forwardly facing passenger seats, including a drivers seat 12.

A seat belt assembly 13 of the lap and diagonal type includes a lap section of webbing 14 extending between a lower outboard anchorage point 15 and a tongue 16, a diagonal section of webbing 17 extending between an upper outboard anchorage point 18 and the tongue 16, and a latch 20 secured to an inner anchorage point 21 and adapted to releasably engage the tongue 16.

In use, the lap section 14 extends across the hips of a passenger 19 and the diagonal section 17 extends diagonally across the chest of the passenger 19.

An ultrasonic transmitter 22 is mounted about half way along the diagonal section 17 and an ultrasonic receiver 23 is mounted in the body structure in front of the associated passenger seat 12. Alternative positions A on the header rail 46 and B on the instrument panel 47 are illustrated in FIG. 1. Other positions may be chosen provided only that the transmitter is visible to the receiver only if the diagonal section 19 passes in front of the passenger 19.

A seat belt switch 24 in the latch 20 is closed when the tongue 16 is properly engaged with the latch 20. A seat load sensing switch 25 is closed by the weight of a passenger sitting in the seat 12.

In the preferred embodiment, there are four passenger seats each with a respective seat belt assembly with associated individual transmitter and receiver sets and seat belt and seat load sensing switches. A wiring diagram of the preferred embodiment is shown in FIG. 2.

A seat belt alarm circuit 26 is connected to a secondary battery power source by an ignition switch 27 when the ignition switch is closed to supply current to an ignition coil.

A four input NAND gate 28 produces a seat belt alarm signal on its output line 29 unless there is a signal on each one of its inputs 30. Each input 30 is connected to the ignition switch 27 by a respective switching circuit 31 associated with a respective seat belt assembly 13.

The seat load sensing switch 25 connects the input 48 of the switching circuit 31 directly to the input 30 via line 32 if the seat is unoccupied or to the seat belt switch 24 if the seat is occupied. A cut-out switch 33 controlled by a timer 34 connects the seat belt switch 24 either to the input of the ultrasonic transmitter 22 or to line 32.

The ultrasonic receiver 23 supplies a signal directly to input 30 if it is receiving a signal from the transmitter 22, i.e., if the transmitter 22 is turned on by a signal at its input and if there is no passenger or other obstacle intermediate the transmitter and the receiver. The frequency of the operation of each transmitter/receiver set is well above audible frequencies and preferably is different from the operating frequencies of the other sets to avoid interference of one set with another and prevent any receiver from responding to a signal from one of the other transmitters.

The timer 34 is effective 10 to 30 secs. after the NAND gate output falls to switch the cut-out switches 33 to lines 32 thereby cutting out the transmitter receiver sets.

The seat belt alarm signal on line 29 energizes a visual alarm 35 which may be a flashing light on the instrument panel and/or an audible alarm 36 which may be a buzzer. Alarms 35 and 36 are of a kind which could be ignored without great inconvenience. There is a more obtrusive further alarm device 37 of a kind which cannot reasonably be ignored. In the present embodiment, the further alarm energizes the vehicle horn and flashes the headlights. The further alarm could alternatively be arranged to cut-out ignition or reduce vehicle speed below a safe value.

The horns 37 are connected by a relay circuit through a gear switch 38, closed only in 2nd and higher forward gears, to the ignition switch.

A first relay 39 has a coil 40 energized by the seat belt alarm signal on line 29 and normally connects the gear switch 38 to the coil 41 of a second relay 42. When the alarm signal is present, the first relay connects the gear switch 38 to the input 43 of the second relay 42, as illustrated in FIG. 2.

The second relay connects its input 43 directly to the horns if it is not energized or through a timer 44 if it is energized.

A holding contact 45 is connected so that the second relay holds itself from the gear switch 38.

In operation, the ignition switch is turned on and signals are supplied directly to those inputs 30 of NAND gate 28 which are associated with unoccupied seats. The inputs associated with occupied seats do not receive a signal unless the seat belts are fastened (seat belt switches closed) and the diagonal section is in front of the passenger (ultrasonic receiver detects transmitted signal). As soon as all inputs are presented to the NAND gate, the NAND gate output falls and the timer 34 cuts-out, the transmitter receiver sets 10 to 30 sec. later so that the alarms are not activated by such activities as reading when the transmitter is screened from the receiver.

Thus, audio and visual alarms 35 and 36 are activated if the ignition is turned on without all passengers having their seat belts correctly fastened. However, nothing further would happen if the engine is started and the vehicle driven in first or reverse gear. The circuit would then be in the state illustrated in FIG. 2. As soon as a change is made into second gear, the horns immediately sound, warning the driver not to proceed without ensuring that the seat belts of all his passengers are properly fastened.

If the change into second gear is made with all passengers properly belted, the gear switch 38 energizes the second relay thereby connecting the horn alarm to the alarm circuit through the timer 44. After this transition to normal driving has been made, the horns will not sound in response to an alarm signal on line 29 until the timer 44 times out. The delay of timer 44 is about 1 minute which is sufficient to permit a belt to be temporarily unfastened when a passenger wishes to lean over to retrieve articles from a parcel shelf or to attend to children on the back seat.

It will be appreciated that if such unfastened does take place, the alarms 35 and 36 immediately come on and the transmitter/receiver sets are reactivated by the timer 34 to ensure that the unfastened belt is properly refastened.

The positions of the transmitter and receiver may be reversed so that the receiver is on the belt and the transmitter on the body structure.

The transmitter/receiver sets may alternatively use electromagnetic radiation of radio, infra-red or visible wave lengths.

The transmitter and receiver may be both mounted on the body structure and the belt arranged to reflect signals from the transmitter to the receiver.

We claim:

1. A motor vehicle seat belt alarm system for the protection of a passenger in said motor vehicle, which comprises:
   a motor vehicle body structure;
   a forward-facing passenger seat mounted within said body structure;
   a seat belt assembly connected to said body structure;
   transmitter means and receiver means, said receiver means being responsive to said transmitter means, for determining if a portion of said seat belt assembly passes in front of said passenger when said passenger is in said seat;
   an alarm; and
   electrical circuit means for energizing said alarm when said transmitter means and said receiver means determines that said portion of said seat belt assembly does not pass in front of said passenger.

2. A seat belt alarm system in accordance with claim 1, wherein said transmitter means is fixed to said seat belt assembly portion and wherein said receiver means is fixed to said body structure.

3. A seat belt alarm system in accordance with claim 1, wherein said receiver means is fixed to said seat belt assembly portion and wherein said transmitter means is fixed to said body structure.

4. A seat belt alarm system in accordance with claim 1, wherein said electrical circuit means includes seat load sensing switch means for indicating the presence of said passenger in said seat.

5. An alarm system in accordance with claim 4, wherein said electrical circuit means further includes timer and switch means for cutting-out said transmitter means and said receiver means a predetermined time interval after said receiver means has responded to said transmitter means.

6. A seat belt alarm system in accordance with claim 5, wherein said alarm comprises a first alarm and a second alarm and wherein said electrical circuit means further includes circuit means for energizing said first alarm when said transmitter means and said receiver means determines that said seat bealt assembly portion does not pass in front of said passenger, and circuit means for energizing said second alarm when said transmitter means and said receiver means determines that said seat belt assembly portion does not pass in front of said passenger and said vehicle is in a pedetermined normal driving condition.

7. A seat belt alarm system in accordance with claim 8, wherein said electrical circuit means includes means for preventing, once said vehicle has been placed in said normal driving condition, energization of said second alarm for a predetermined time interval after said transmitter means and said receiver means determines that said seat belt assembly portion does not pass in front of said passenger.

8. A seat belt alarm system in accordance with claim 1, wherein said alarm comprises a first alarm and a second alarm and wherein said electrical circuit means further includes circuit means for energizing said first alarm when said transmitter means and said receiver means determines that said seat belt assembly portion does not pass in front of said passenger, and wherein said electrical circuit means further includes circuit means for energizing said second alarm when said transmitter means and said receiver means determines that said seat belt assembly portion does not pass in front of said passenger and said vehicle is in a predetermined normal driving condition.

9. A seat belt alarm system in accordance with claim 10, wherein said electrical circuit means includes means for preventing, once said vehicle has been placed in said normal driving condition, energization of said second alarm for a predetermined time interval after said transmitter means and said receiver means determines that said seat belt assembly portion does not pass in front of said passenger.

* * * * *